United States Patent [19]

Tarutani

[11] 3,835,729

[45] Sept. 17, 1974

[54] MEANS FOR PREVENTING DRIVING CHAIN FROM COMING OFF MULTI-SPEED TRANSMISSION FRONT GEAR FOR BICYCLE

[76] Inventor: Satoshi Tarutani, c/o Shimano Industrial Co., Ltd., 77, 3-cho, Oimatsu, Sakai-shi, Osaka Prefecture, Japan

[22] Filed: Nov. 24, 1972

[21] Appl. No.: 308,943

[30] Foreign Application Priority Data
Nov. 27, 1971 Japan................................ 46-111684

[52] U.S. Cl................. 74/611, 74/594.2, 308/179.5, 308/191
[51] Int. Cl............................................. F16p 1/00
[58] Field of Search .......... 74/243 DR, 217 B, 611, 74/594.2; 308/23.5, 179.5, 191, 216

[56] References Cited
UNITED STATES PATENTS

| | | | |
|---|---|---|---|
| 552,376 | 12/1895 | Jordan............................ | 308/179.5 |
| 589,496 | 9/1897 | Burnham........................ | 308/179.5 |
| 704,138 | 7/1902 | Spencer.......................... | 308/179.5 |
| 3,477,303 | 11/1969 | Brilando.............................. | 74/611 |

FOREIGN PATENTS OR APPLICATIONS

| | | | |
|---|---|---|---|
| 1,256,502 | 2/1961 | France.............................. | 74/594.2 |
| 963,806 | 7/1950 | France.............................. | 74/594.2 |

*Primary Examiner*—Samuel Scott
*Assistant Examiner*—Allan Russell Burke
*Attorney, Agent, or Firm*—Toren, McGeady and Stanger

[57] ABSTRACT

In a multi-speed transmission front gear system mounted on a bicycle crank shaft for rotation therewith, the gear system at least two different dent-numbered sprocket wheels, a discoidal chain guard member having a larger diameter than that of the minimum dent-numbered lower speed sprocket wheel, a fitting flange adapted to support the lower speed sprocket wheel on the foremost end of a hub which supports the crank shaft thereon and a cutout is formed on the fitting flange for accommodating member so that a driving chain for transmitting the rotation of the crank shaft to a rear wheel is prevented from coming off the lower speed sprocket wheel and can be automatically brought into engagement with the lower speed sprocket wheel even if it has slipped off the sprocket wheel.

8 Claims, 7 Drawing Figures

MEANS FOR PREVENTING DRIVING CHAIN FROM COMING OFF MULTI-SPEED TRANSMISSION FRONT GEAR FOR BICYCLE

The present invention relates to improvements in a means for preventing a driving chain from slipping off a multi-speed transmission front gear system rigidly fixed to a crank shaft rotatable by the operation of a foot-driven pedal means for a bicycle, and more particularly it relates to a means of the type wherein a multi-speed transmission front gear system comprises a plurality of different dent-numbered sprocket wheels juxtaposed on the outer periphery thereof at regularly spaced apart intervals, and wherein the driving chain is selectively engageable with any one of the sprocket wheels by means of an independently mounted gear-shifting system for transmitting the rotation of the sprocket wheel rotating along with the crank shaft to the rear wheel of the bicycle at a determined speed change rate whereby the chain is completely prevented from slipping off the lower speed sprocket wheel, and even in the event that the chain gets off the lower speed sprocket wheel, it can be automatically brought into engagement with this gear.

Conventionally, it has been well known to construct a bicycle front gear system by mounting thereto a plurality of different dent-numbered sprocket wheels and to provide a gear-shifting system which serves to guide a driving chain to selective engagement with any of these sprocket wheels for changing the running speed of a bicycle.

However, when the driving chain is moved for example from a higher speed sprocket wheel to a lower speed one by operating the gear-shifting system, the movement of the chain cannot be exactly controlled by the operation of the system, and results in the chain riding over the lower speed sprocket wheel, and often falling down outwardly of the sprocket wheel. Furthermore, when the gear-shifting system is operated abruptly in haste, the driving chain will come off the lower speed sprocket wheel as easily as in the preceding case.

Thus in case the chain has come off the lower speed sprocket wheel, a cyclist is unable to keep on riding a bicycle any longer, consequently being exposed to a jeopardy that he will easily lose a balance and fall down. Thus in order to obviate the above-mentioned jeopardy it is necessary for him to effect slowly and accurately the movement of the driving chain by operating said gear-shifting system; for this purpose, said system must be provided with a particular type of adjusting stopper means for exactly controlling the range within which the driving chain is permitted to move.

However, according to the above-mentioned system, it requires much time and labor to providently adjust the range of said chain movement by using the aforesaid adjusting stopper means and, in addition, it often happens to a cyclist that he forgets the adjusting operation of the range so that the driving chain easily gets off a desired sprocket wheel even if he tries to shift the chain thereonto.

Furthermore, said system will become complicated in structure and expensive in the cost of manufacture provided that the above-mentioned adjusting stopper means is mounted on the system.

In the meanwhile, another technique has been proposed to form a discoidal chain guard which is substantially larger in diameter than the highest speed sprocket wheel provided on the outer wall of the sprocket so as to prevent the chain from getting off the very sprocket.

However, this technique is practically not applicable to the lowest speed sprocket wheel because the excessively small space between the lowest speed sprocket wheel and a chain stay member cannot be made larfer due to the inevitable limitation of structural formation.

If the above-mentioned discoidal chain guard is provided on the outer wall of the lowest speed sprocket wheel, the guard will abut against the chain stay member to stop the rotation of the front gear system.

Thus the conventional multi-speed transmission front gear system is not provided with a particular means for preventing a chain from slipping off the lower speed sprocket wheel.

Accordingly, the present invention has been designed to eliminate all the above-mentioned drawbacks and disadvantages and has as one of its main objects the provision of a multi-speed transmission front gear system so adapted that when a driving chain engaged with a higher speed sprocket wheel is shifted to a lower speed sprocket wheel, the chain can be prevented from running off the sprocket wheel and becoming outside of it.

It is another object of the invention to provide a multi-speed transmission front gear system so adapted that even if the driving chain becomes disengaged from a lower speed sprocket wheel, the chain is automatically induced to engage with the sprocket wheel.

It is a further object of the invention to provide a multi-speed transmission front gear system which, owing to a discoidal chain guard of known type mounted to the higher speed transmission sprocket wheel, can either dispense with the adjusting stopper means or operate per se accurately without necessitating the exact adjusting operation of the adjusting stopper means.

Still another object of the invention to provide said means which can be easily applied to existing types of bicycles.

In other words, the multi-speed transmission front gear system, in accordance with the present invention, is featured with a chain guard body comprising a discoidal chain guard member which is substantially larger in diameter than the lower speed sprocket wheel and is provided with a fitting means formed in the center of the chain guard member so as to allow the member to be mounted to a hub means; the system is provided, at a portion of the discoidal chain guard member, with a cutout for avoiding contact with a frame member; and fixing the chain guard means to one end portion of the hub means.

With these and other objects and advantages in view, which will become apparent from the following detailed description, the present invention will be clearly understood in connection with the accompanying drawings, in which:

Now setting forth in detail the multi-speed transmission front gear system of the present invention with reference to the accompanying drawings, reference numeral 10 designates a two-speed transmission front gear system comprising two different dent-numbered sprocket wheels 11, 12. In this system 10 it is preferable have more than two different dentnumbered sprocket wheels for selectively changing the desired speed of a bicycle of more than two steps.

In the drawings the sprocket wheel 11 which is smaller in the number of dents is shown as the lower speed transmission sprocket wheel while the sprocket wheel 12 which is larger in the number of dents is shown as a higher speed transmission sprocket wheel.

The sprocket wheels 11 and 12 are perforated with three threaded holes 111 and 121, respectively, in the positions where they are circumferentially equally divided into three sections.

Mounted between these sprocket wheels 11 and 12 are three collars 13 of equal length each aligned with a pair of spaced holes 111 and 121. Three tightening shafts 14 are inserted each into one of the collars 13 through the threaded holes and tightened up with suitable nut means (not shown in the drawings) thereby tightly fixing the sprocket wheels 11, 12 with one another at a regularly spaced apart interval.

The lower speed sprocket wheel 11 has a boss 113 supported by a plurality of supporting arms 112 extending toward the center of the wheel to the boss.

The multi-speed transmission front gear system constructed in the above-mentioned manner is rigidly fixed on a crank shaft 151 which will be referred to hereinafter.

Figure 1:
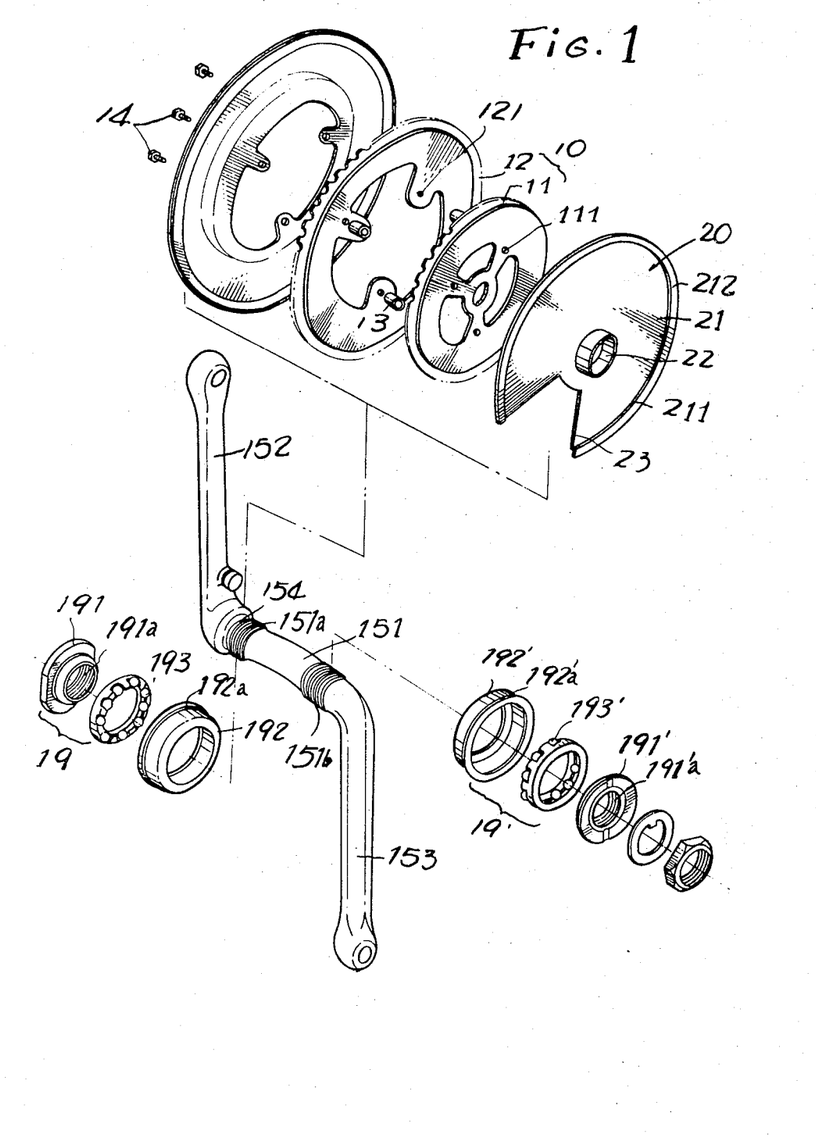
FIG. 1 is a perspective exploded view showing the front gear system of the invention.

The crank shaft 151 is connected at each of its ends to crank members 152, 153 and each crank member is arranged to receive a pedal extending substantially at right angles to it and in the opposed direction to the other pedal. The crank shaft is rotatably supported on a hub means 18 which is held by means of a frame tube 16 of a bicycle and by a pair of frame members 17, 17' through a bearing means 19, 19' as shown in FIG. 1.

Incidentally, at both ends of the crank shaft 151 are formed screw threads 151a, 151b and the end portion of the crank shaft 151 connected to the crank member 152 is provided with a notched portion 154.

The bearing means 19, 19' comprise inner rings 191, 191' having threaded holes 191a, 191'a each threadedly engageable with the screw threads 151a, 151b of the crank shaft 151, outer rings 192, 192' having flange portions 192a, 192'a between which the hub means 18 is held, and a plurality of balls 193 mounted between the inner rings 191, 191' and the outer rings 192, 192'.

The multi-speed transmission front gear system 10 of the present invention is rigidly fixed to the crank member 152 under pressure by forcibly inserting the boss 113 of the system 10 into the notched portion 154 of the crank shaft 151 until the boss 113 reaches the edge of the inner ring 191. Thus the system 10 is mounted on and for rotation with the crank shaft 151.

The mounting of the system 10 on the crank shaft 151 and the connection of the lower speed sprocket wheel 11 with the higher speed sprocket wheel 12 is well know and not always limited to the above-mentioned construction but may be constructed in any other suitable manner.

Figure 2:
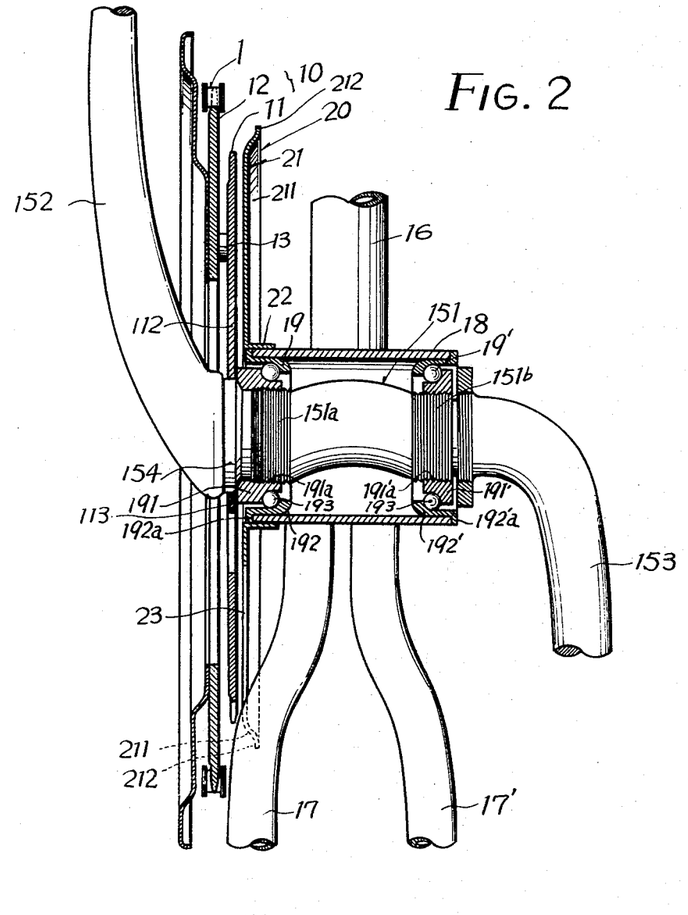
FIG. 2 is a cross sectional view showing an assembled state of the system with some parts omitted.

According to the present invention, a chain guard means to be described subsequently is mounted at the outside of the lower speed sprocket wheel 11 in order that a driving chain 1, note FIG. 2, engaged with the system 10 can exactly transmit the rotation of the crank shaft 151 to a rear wheel (not shown in the drawings but supported by said frame members 17, 17') without a fear of running off the lower speed sprocket wheel 11.

The chain guard means is designated as a whole by reference numeral 20 in the drawings and comprises a discoidal chain guard member 21 which has substantially a larger diameter than that of said lower speed sprocket wheel 11. Mounting or fitting means 22 disposed in the center of member 21 is arranged to mount the member 21 to the foremost end of the hub means 18. The discoidal chain guard member 21 is provided on its circumferential periphery with a bevelled annular portion 211 which projects outwardly from the lower sprocket wheel 11 and is bevelled with respect to the crank shaft 151, and with a vertical annular portion 212 which extends radially outwardly from the bevelled annular portion and perpendicularly to the crank shaft 151.

The chain guard member 20 is provided with a cutout 23 for accommodating therein the frame member 17. The cutout 23 is formed, for example, by cutting the chain guard member 21 at the location of the frame member 17. However, the cutout 23 may be replaced by an indented portion 23' (note FIG. 6) of the member 21, curved in the direction away from the frame member 17 so that the surface of the indented portion facing the frame member is concave and its opposite surface does not interfere with the rotation of the lower speed sprocket wheel.

The fitting means 22 formed integrally on the chain guard means 20 in concentrical to its axis, is fitted closely on the outer periphery of the foremost end of the hub means 18 at the side of the lower speed sprocket wheel 11 to hold the chain guard 20 at a regularly spaced apart interval with respect to the lower speed sprocket wheel 11. Accordingly, the fitting means 22 affords a cylindrically shaped flange member capable of fitting over the outer surface of the end portion of the hub means 18, for securement thereof by means of welding or other suitable method.

When the driving chain 1 engaged with the higher speed sprocket wheel 12 is to be shifted to the lower speed sprocket wheel 11, the shifting operation is effected by moving the driving chain 1 toward the lower speed sprocket wheel 11 over a gear-shifting system (not shown in the drawing). If in this case the chain 1 is moved too far, or the gear-shifting system is operated abruptly, it is very liable that the chain 1 may run over the lower speed sprocket wheel 11 and fall down outwardly of it; according to the present invention, however, the driving chain 1 is brought into contact with the discoidal chain guard member 21 of the chain guard means 20 and is completely prevented from coming off the lower sprocket wheel 11.

Furthermore, even if the driving chain 1 slips off the lower speed sprocket wheel 11, it rides on the bevelled portion 211 of the chain guard member 21 so that further outward movement of the driving chain 1 is completely blocked by said vertical portion 212 of the chain guard member 21, with the additional advantage that the driving chain 1 on the bevelled portion 211 is automatically guided back along the bevelled portion to engage with the lower speed sprocket wheel 11.

As has been clearly described in the foregoing, the multi-speed transmission front gear system, in accordance with the present invention, enables a cyclist to shift the driving chain 1 in an exact manner from the higher speed sprocket wheel to the lower speed one without any fear that the chain 1 will ride over the lower speed sprocket wheel even if he happens to operate the gear-shifting system in a swift or improper manner.

Incidentally, a gear-shifting system for use in combination with the present invention needs not be provided with any particular adjusting means for controlling the range within which a driving chain is allowed to move thereby making it possible to utilize a gear-shifting system which is simple in structure and low in the cost of manufacture or in the event that an adjusting means is used in the gear-shifting means an exact control is not required but merely a rough operation is sufficient to control the adjusting means very simply and readily.

Since the chain guard means of the present invention is fixed to the foremost end of the hub means located at the side of the lower speed sprocket wheel and is formed with a cutout for accommodating the frame member, the gear-shifting effect can be secured though the space between the lower speed sprocket wheel and the frame member is small and cannot be widened any more because of structural reasons.

The construction of the above-mentioned embodiment is such that the fitting flange means 22 for fixing the chain guard means 20 to the hub means 18 is formed in a cylindrical shape so as to be inserted onto the foremost end of the hub means 18 and rigidly fixed thereto by welding operation or the like. However, this construction may be replaced by the arrangements shown in FIGS. 3 to 7 inclusive.

Figure 3:
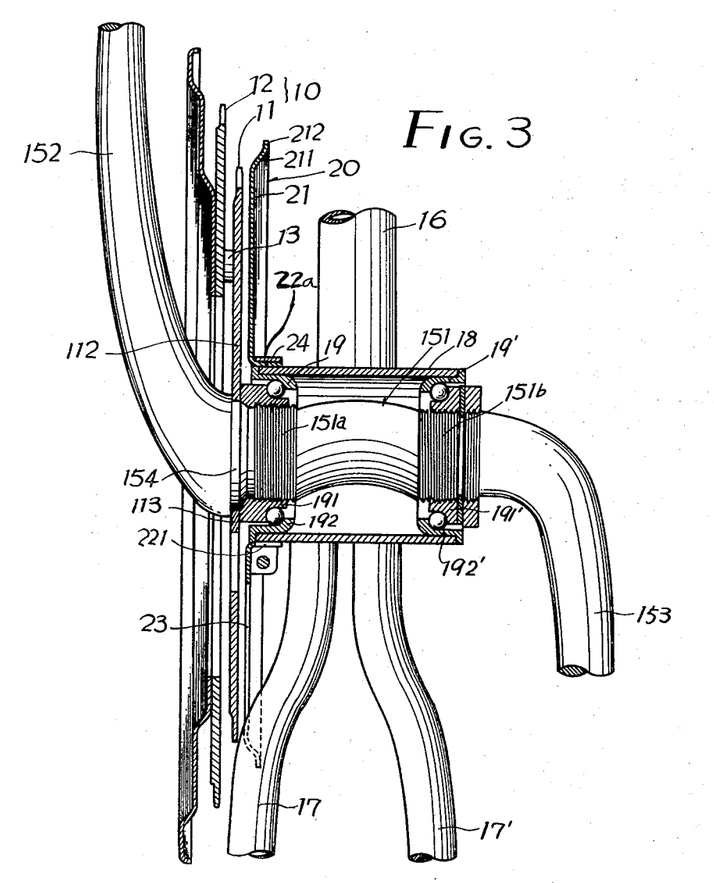
FIG. 3 is a cross sectional view showing another embodiment of the invention with some parts omitted.
Figure 4:
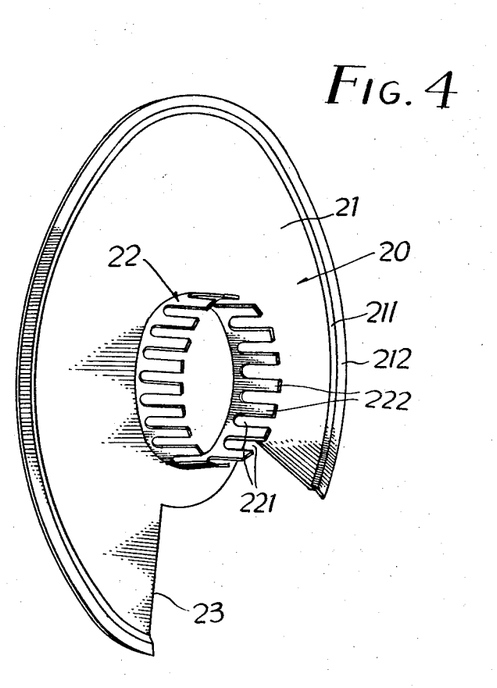
FIG. 4 is a perspective view showing some elemental parts of FIG. 3.

Namely, in FIGS. 3 and 4, a fitting flange 22a formed in a cylindrical shape and is provided with a plurality of plots 221 extending parallel to the axis of the fitting flange 22a and forming a plurality of flexible pin elements 222 fixedly mounted on the foremost end of the hub means 18 by means of a tightening band 24.

Figure 5:
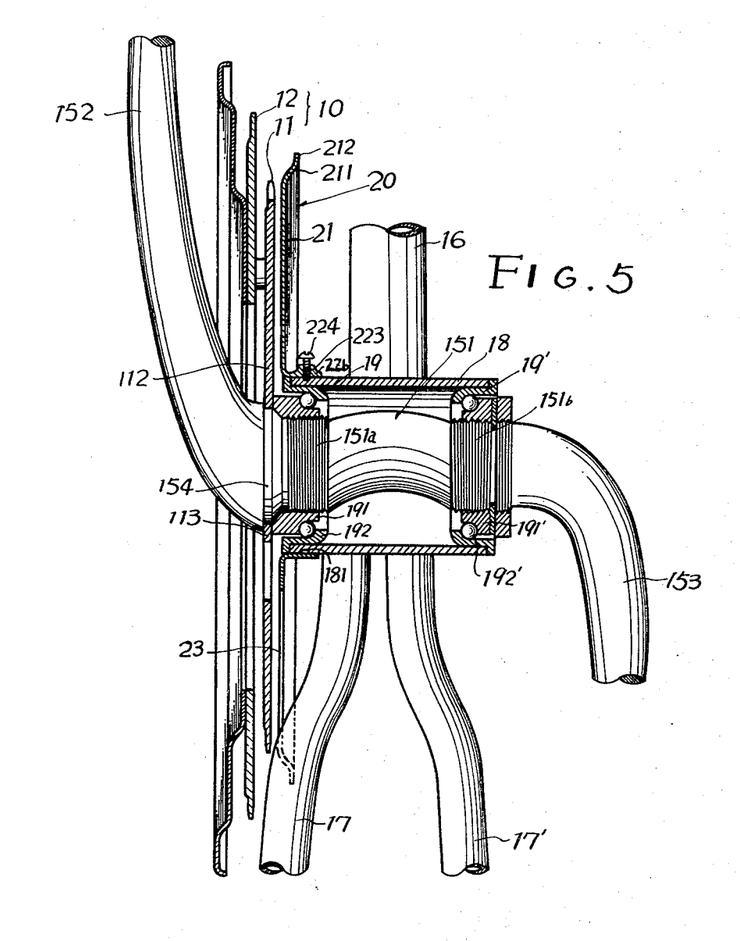
FIGS. 5 to 7 inclusive are perspective views showing further embodiments of the invention with some parts omitted, respectively.

The construction shown in FIG. 5 is such that a cylindrically shaped fitting flange 22 is perforated by a threaded hole 223 and the outer periphery of the foremost end of said hunger 18 is provided with an annular groove 181. A stop screw 224 is threaded into threaded hole 223 of the fitting flange means and seats 226 into the annular groove 181 thereby for rigidly fixing the fitting flange means 226 to the foremost end of the hub means 18 in closely contacting relationship.

Figure 6:
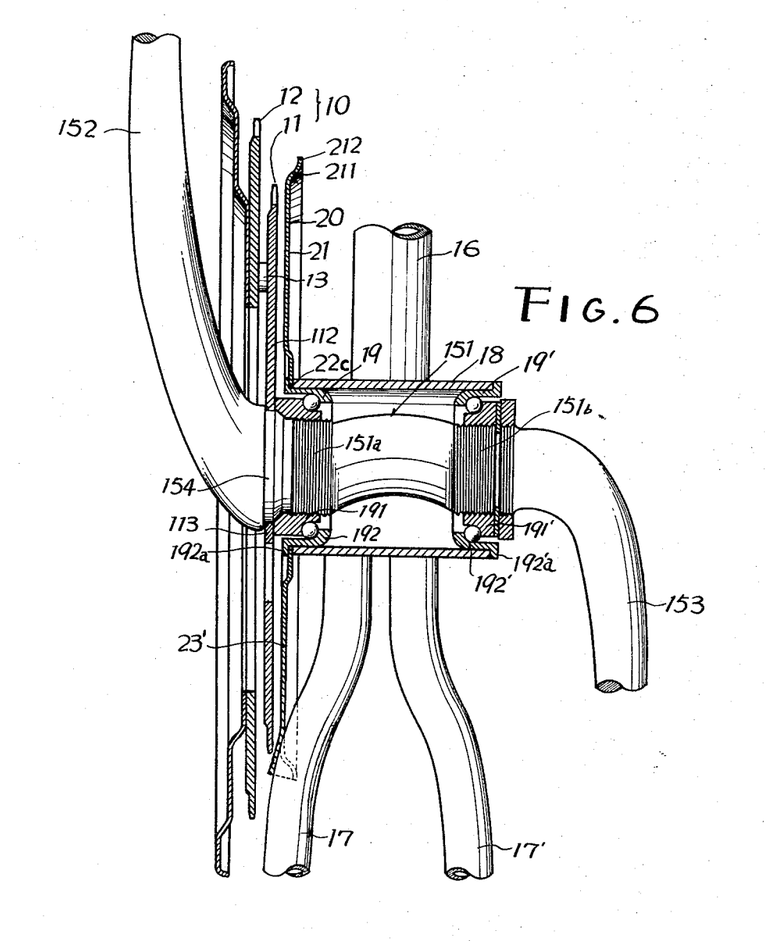

In FIG. 6 is shown a construction in which the chain guard means 20 comprises a doughnut shape disc whose outer periphery is formed as a chain guard member 21 and whose inner periphery as a fitting flange means 22c with fitting flange means 22c held between the foremost end of the hub means 18 and a flange portion 192a of the outer ring 192 of the bearing means 19 for rigidly attaching the fitting flange means 22c to the hub means 18.

Figure 7:
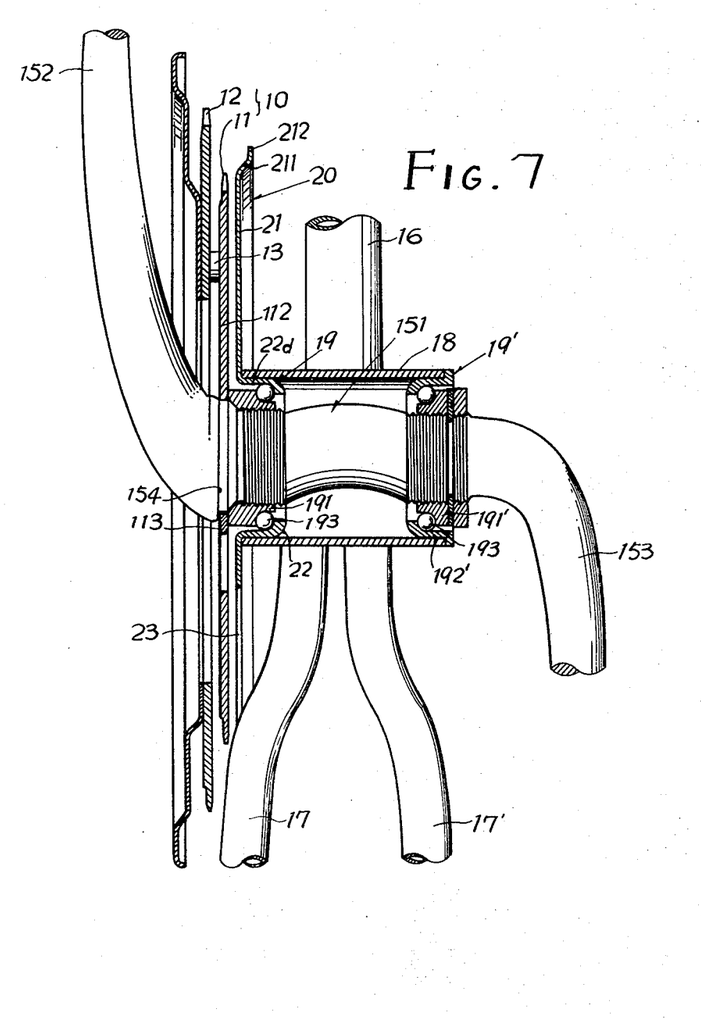

In FIG. 7 is shown a construction in which fitting flange means 22d comprises a cylindrical body which has a smaller outer diameter than the inner diameter of the hub means 18 and serves in place of the outer ring 192 for holding a ball 193 cooperatively with the inner ring 191 of the bearing means 19. The fitting flange means 22d servicing as the outer ring 192, is inserted into the foremost end of the hub means 18 and is rigidly fixed thereto by welding operation or the like.

It will be understood that the present invention is not to be limited to the exact construction shown and described, but that various changes and modifications may be made without departing from the spirit and scope of the invention, as defined in the appended claims.

What is claimed is:

1. In a bicycle comprising an annular shaped hub means having a first end and a second end, a rotatable crank shaft mounted in said hub means, a bicycle frame member secured to and extending from said hub means, a multi-speed transmission front gear system fixedly mounted on said crank shaft, said gear system comprising at least two sprocket wheels disposed in side-by-side relationship and each provided with a different number of dents, said sprocket wheels comprising a higher speed sprocket wheel and a lower speed sprocket wheel concentric to a common axis, wherein the invention comprises that said gear system comprises a chain guard means including a discoidal chain guard member concentric to the common axis of said sprocket wheels and having a diameter larger than that of said lower speed sprocket wheel, a fitting flange means disposed in the center of said chain guard member and supporting said chain guard member on the first end of said hub means, said chain guard member positioned on said hub means and located adjacent to said frame member secured to said hub means and also positioned between said frame member and said lower speed sprocket wheel and spaced from said lower speed sprocket wheel at an interval, said chain guard member shaped in the portion thereof located adjacent to said frame member to accommodate said frame member extending through the space occupied by said chain guard member, and fixing means for rigidly securing said fitting flange means of said chain guard means to the first end of said hub means.

2. In a bicycle, as set forth in claim 1, wherein said fitting flange means comprises a cylindrical portion concentric to the axis of said sprocket wheel and secured to said discoidal chain guard member and extending outwardly from the side thereof which faces away from said lower speed sprocket wheel, a plurality of regularly spaced flexible fin elements formed integrally with the edge of said cylindrical portion directed away from said lower speed sprocket wheel and said fin elements extending in the axial direction of said sprocket wheels, each pair of adjacent said fins forming therebetween an axially extending open-ended slot, and tightening band means wound on the outer periphery of said fin elements for constrictively tightening said fin elements onto said hub means.

3. In a bicycle, as set forth in claim 1, wherein said fitting flange means comprises a cylindrical portion concentric to the axis of said sprocket wheels and extending outwardly from said chain guard member on the opposite side thereof from said lower speed sprocket wheel, said cylindrical portion arranged to fit over the first end of said hub means and having a threaded hole extending through at least one side thereof, a stop screw screwed into said threaded hole and having a length thereof sufficient to permit said stop screw to extend through said threaded hole into contact with the outer periphery on the first end of said hub means, and said hub means having an annular groove formed on the outer periphery thereof to receive the end of said stop screw inserted through the threaded hole in said cylindrical portion.

4. In a bicycle, as set forth in claim 1, including means for rotatably supporting said sprocket wheels on said hub means, said means for rotatably supporting said sprocket wheels comprises bearing means, said bearing means comprises an outer race fitted into the first end of said hub means, said outer race having a radially outwardly directed flange portion disposed in juxtaposed spaced relationship to the first end of said hub means, said chain guard member having a centrally arranged opening therethrough, said fitting flange means comprises an annular portion forming the edge of the opening in said chain guard member, and said fixing means comprises said radially outwardly directed flange portion of said outer race and the juxtaposed end of said hub means with said annular portion of said fitting flange means held securely therebetween.

5. In a bicycle, as set forth in claim 1, wherein the shaped portion of said chain guard member comprises a cutout formed in said chain guard member extending inwardly from its outer circumferential periphery to a position spaced outwardly from said fitting flange means.

6. In a bicycle, as set forth in claim 1, wherein the shaped portion of said chain guard member located in juxtaposition to said frame member is curved out of the plane of said discoidal chain guard member toward said second sprocket wheel with the side of the curved shaped portion of said chain guard member facing said frame member having a concave shape to accommodate the configuration of said frame member.

7. In a bicycle comprising an annular shaped hub means having a first end and a second end, a rotatable crank shaft mounted in said hub means, a bicycle frame member secured to and extending from said hub means, a multi-speed transmission front gear system fixedly mounted on said crank shaft, said gear system comprising at least two sprocket wheels disposed in side-by-side relationship and each said sprocket wheel provided with a different number of dents, said sprocket wheels comprising a higher speed sprocket wheel and a lower speed sprocket wheel concentric to a common axis, bearing means for rotatably mounting said sprocket wheels, wherein the invention comprises that said gear system comprises a chain guard means comprising a discoidal chain guard member concentric to the common axis of said sprocket wheels and having a diameter larger than that of said lower speed sprocket wheel, a fitting flange means disposed in the center of said chain guard member for supporting said chain guard member on the first end of said hub means, said chain guard member located adjacent to said frame member secured to said hub means and located between said frame member and said lower speed sprocket wheel and spaced from said lower speed sprocket wheel at an interval, said fitting flange means comprises a cylindrical portion coaxial with the common axis of said sprocket wheels and extending outwardly from said chain guard member on the opposite side thereof from said sprocket wheels, said cylindrical portion having a smaller outside diameter than the inside diameter of said hub means so that it is insertable into the first end of said hub means, the end of said cylindrical portion spaced axially from said chain guard member is curved inwardly and forms an internally curved surface which affords an outer bearing race for said bearing means for said sprocket wheels, said cylindrical portion being secured within said hub means for supporting and fixing said chain guard member in position, said chain guard member shaped in the portion thereof located adjacent said frame member to accommodate said frame member extending to the space occupied by said chain guard member.

8. In a bicycle, as set forth in claim 7, wherein the shaped portion of said chain guard member located in juxtaposition to said frame member is curved out of the plane of said discoidal chain guard member towards said second sprocket wheel with the side of said chain guard member facing said frame member and having a concave shape to accommodate the configuration of said frame member.

* * * * *